United States Patent
Jacquin et al.

[11] Patent Number: 6,167,162
[45] Date of Patent: Dec. 26, 2000

[54] RATE-DISTORTION OPTIMIZED CODING MODE SELECTION FOR VIDEO CODERS

[75] Inventors: Arnaud Eric Jacquin, New York, N.Y.; Kyeong Ho Yang, Freehold, N.J.

[73] Assignee: Lucent Technologies Inc., Murray Hill, N.J.

[21] Appl. No.: 09/411,112

[22] Filed: Oct. 4, 1999

Related U.S. Application Data

[63] Continuation-in-part of application No. 09/178,088, Oct. 23, 1998.

[51] Int. Cl.$^7$ ........................................ G06K 9/36
[52] U.S. Cl. ........................................ 382/251; 348/405
[58] Field of Search ........................ 382/251, 250, 382/232, 253; 348/405, 406, 407; 341/200; 375/240, 245; 342/197

[56] References Cited

U.S. PATENT DOCUMENTS

| | | | |
|---|---|---|---|
| 4,491,953 | 1/1985 | Bellisio et al. | |
| 5,283,646 | 2/1994 | Bruder. | |
| 5,691,770 | 11/1997 | Keesman et al. | 348/405 |
| 5,870,435 | 2/1999 | Choi et al. | |
| 6,037,738 | 3/2000 | Sethuraman | 382/238 |
| 6,804,898 | 7/2000 | Chiang et al. | 348/407 |

OTHER PUBLICATIONS

Lei et al. "Rate Control in DCT Video Coding for Low–Delay Communications" IEEE Transaction on Circuits and Systems for Video Tech, vol. 9, No. 1 pp. 172–185, Feb. 1999.

Hsu et al. "A Larangian optimization approach to rate control for delay–constraned video transmission over burst–error channels" Proc. of the 1998 IEEE International Conference on Acoustic, Speech and Signal Processing, vol. 5, pp 2989–2992, Feb. 1999.

Wiegand, T., M. Lightstone, D. Mukherjee, T.G. Campbell and S.K. Mitra, "Rate–Distortion Optimized Mode Selection for Very Low Bit Rate Video Coding and the Emergin H.263 Standard," IEEE Trans. Circuits and Systems for Video Technology, vol. 6, No. 2, Apr., 1996.

*Primary Examiner*—Amelia Au
*Assistant Examiner*—Jingge Wu
*Attorney, Agent, or Firm*—William Ryan

[57] ABSTRACT

A new method for real time implementation of rate-distortion optimized coding mode selection is disclosed that can be efficiently applied to H-263-compatible video codecs and other codecs of similar type. A normalized rate-distortion model is used to efficiently compute the rate and the distortion when encoding motion-compensated prediction error signals, instead of performing DCT, quantization and entropy-encoding. A fast algorithm is also disclosed that determines sub-optimal values of coding parameters such as the quantization parameter and the Lagrangian multiplier, $\lambda$, for the trellis search. Very good rate control and picture quality are achieved, especially when the disclosed techniques are applied in very low bitrate video coding.

24 Claims, 2 Drawing Sheets

RATE-DISTORTION OPTIMIZED CODING MODE SELECTION FOR VIDEO CODERS

RELATED APPLICATION

The present application is a continuation-in-part of the pending patent application by A. E. Jacquin, N. S. Jayant, and K. H. Yang, entitled *Normalized Model for Quantization of Digital Signals*, Ser. No. 09/178,088 filed Oct. 23, 1998, which is assigned to the assignee of the present application. The cited parent application is hereby incorporated by reference as if set forth in its entirety herein.

FIELD OF THE INVENTION

The present invention relates to high speed video coders for transmission, storage and reproduction, including video coders for low-bitrate encoding of video signals. More particularly, the present invention relates to systems and methods for rate-distortion optimizing the selection of coding modes for video coders.

BACKGROUND OF THE INVENTION

In many videocoding algorithms such as H.261, H.263, MPEG-1, MPEG-2, and MPEG-4, hybrid coding methods are used to efficiently represent video sequences. See, for example *Draft of MPEG-2: Test Model 5*, ISO/IEC JTC1/SC29/WG11, April 1993; and *Draft ITU-T Recommendation H.263*, ITU-T SG XV, December 1995. In these schemes, motion compensated prediction (MCP) is first performed to reduce the temporal redundancy in a video sequence and the resultant MCP errors are then encoded with discrete cosine transform (DCT), quantization, and entropy coding. In such hybrid coding systems, there is always a trade-off in distortion (D) and rate (R) between MCP and residual coding (RC). If a coder assigns too many bits for motion vector encoding, it may find itself with not enough bits left to properly encode MCP errors, and vice versa. It is therefore important to find an optimal bit allocation between MCP and RC that provides the smallest overall distortion.

A rate-distortion optimized coding mode selection scheme proposed in Wiegand, T, and M. Lightstone, D. Mukherjee, T. G. Campbell and S. K. Mitra, "Rate-distortion optimized mode selection for very low bit rate video coding and the emerging H.263 standard," *IEEE Trans. Circuits Syst. Video Tech.*, vol. 6, no. 2, pp. 182–190, April, 1996, provides improvement in rate control as well as in picture quality, especially in very low bitrate video coding applications. However this scheme performs Discrete Cosine Transforms (DCT), quantization, de-quantization, and entropy-encoding to obtain distortion (D) and rate (R) for residual coding (RC). This required high level of computational complexity proves impractical for real-time implementations.

SUMMARY OF THE INVENTION

Limitations of the prior art are overcome and a technical advance is achieved in a system and method for real-time implementation of mode selection in rate-distortion optimized video coding. Illustrative embodiments of the present invention are described in the following detailed description.

Briefly, in illustrative embodiments of the present invention, we make use of the normalized rate-distortion model described in the parent application of this continuation-in-part application and in Yang, K. H., A. Jacquin and N. S. Jayant, "A normalized rate-distortion model for H.263-compatible codecs and its application to quantizer selection," *Proc. ICIP*, October 1997, to efficiently compute the rate and distortion when encoding motion-compensated prediction error signals. This avoids the need of prior methods to perform DCT, quantization and entropy-encoding.

A fast algorithm is also disclosed that determines sub-optimal values of coding parameters such as the quantization parameter and the Lagrangian multiplier, $\lambda$, for a trellis search used in the optimizing methods. These additional techniques further reduce complexity, thus making our inventive coding mode selection methods and systems useful for real-time software video codecs. Thus, very good rate control and picture quality are achieved, especially when the disclosed techniques are applied in very low bitrate video coding.

These and other aspects of the present invention will be fully understood from a consideration of the following detailed description taken with the attached drawing, wherein.

Figure 3A:
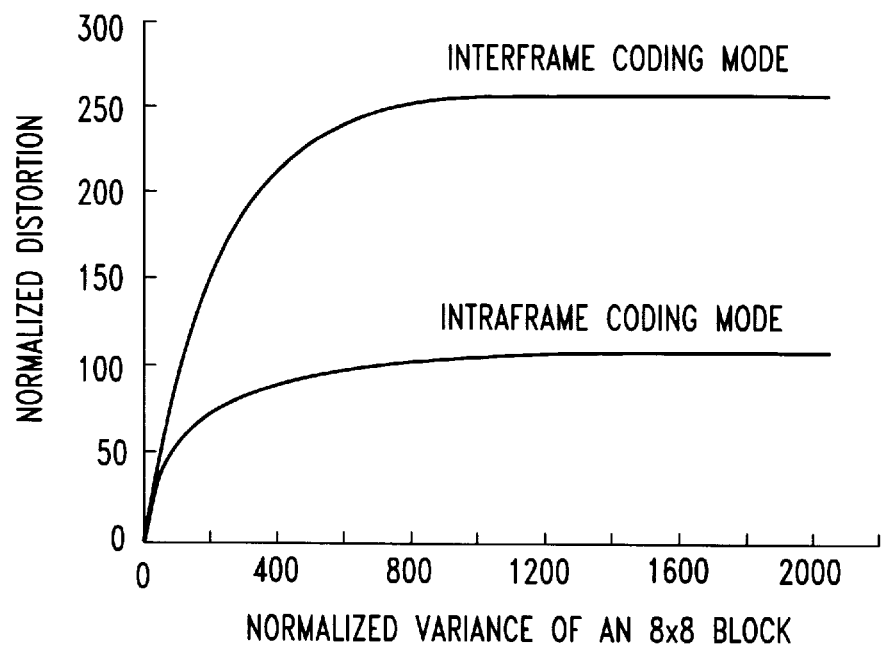
Figure 3B:
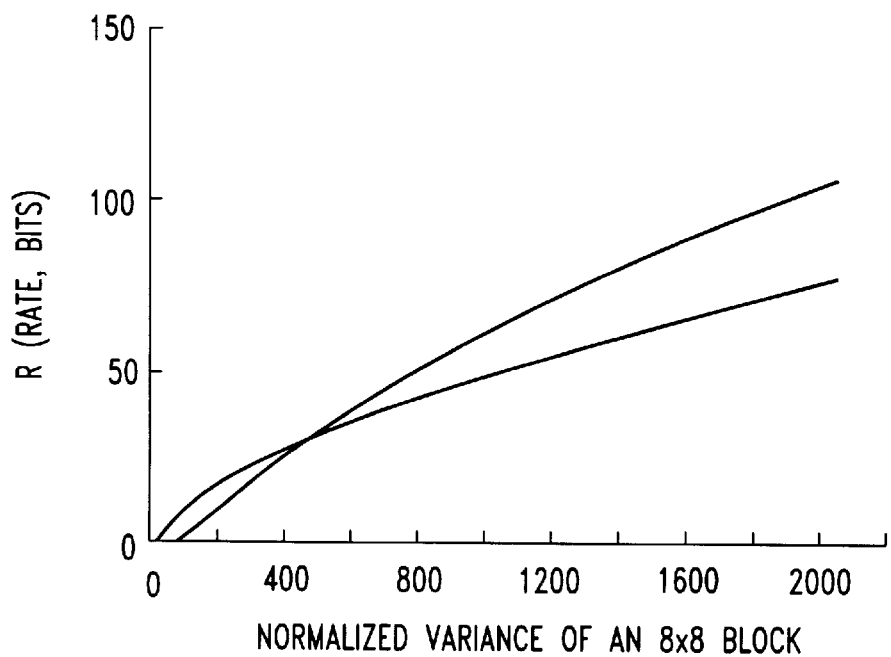

FIGS. 3A and 3B are normalized rate-distortion curves for illustrative H.263-compatible video codes, with variance used as an energy measure. FIG. 3A shows an illustrative $\hat{D}-\hat{V}$ curve; FIG. 3B shows an illustrative $R-\hat{V}$ curve.

DETAILED DESCRIPTION

In the context of ITU-T standard H.263, coding mode selection means deciding which coding scheme to use for each macroblock. The different schemes are:

i) interframe coding based on 16×16 block motion compensation (mode 0), ii) interframe coding based on 8×8 block motion compensation (mode 1), iii) intraframe coding (mode 2), and iv) uncoded mode (mode 3) where the macroblock is represented by simply duplicating the contents of the corresponding macroblock in the previous frame. Rate-distortion optimized coding mode selection is the problem of finding a quantization parameter (QP) and a set of coding modes $M=\{M_{i,j}, i=1, 2, \ldots, n, j=1, 2, \ldots, m\}$ for a frame X, which minimize the overall distortion $D_{overall}$ under the rate constraint $R_T$:

$$\text{minimize}_{(QP,M)} D_{overall} \text{ subject to } R_{overall}(QP, M, X) < R_T, \quad (1)$$

where $R_{overall}$ represents the number of bits used for encoding X. This constrained problem can be converted to an unconstrained one by introducing a Lagrangian multiplier, $\lambda$:

$$\text{minimize}_{(QP)}[\text{minimize}_{(M)} J(QP, M, X) = D_{overall}(QP, M, X) + \lambda \cdot R_{overall}(QP, M, X)]. \quad (2)$$

In the H.263 standard, the rate and the distortion for a macroblock $MB_{i,j}$ is dependent not only on the current mode but also the modes of adjacent macroblocks, due to the DPCM structure of motion vector encoding and the overlapped block motion compensation, respectively. See FIGS. 1A and 1B.

Figure 1A:
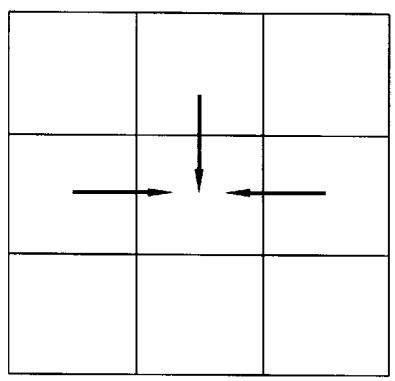
FIGS. 1A and 1B show dependencies of distortion and rate, respectively, for a given macroblock on modes of adjacent macroblocks.
Figure 1B:
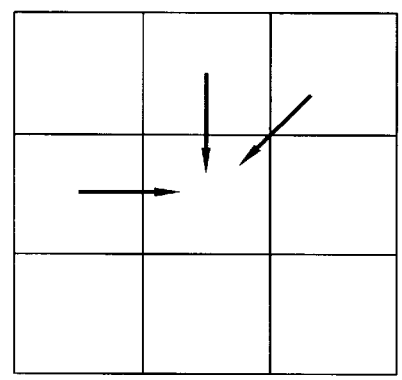
Figure 2:
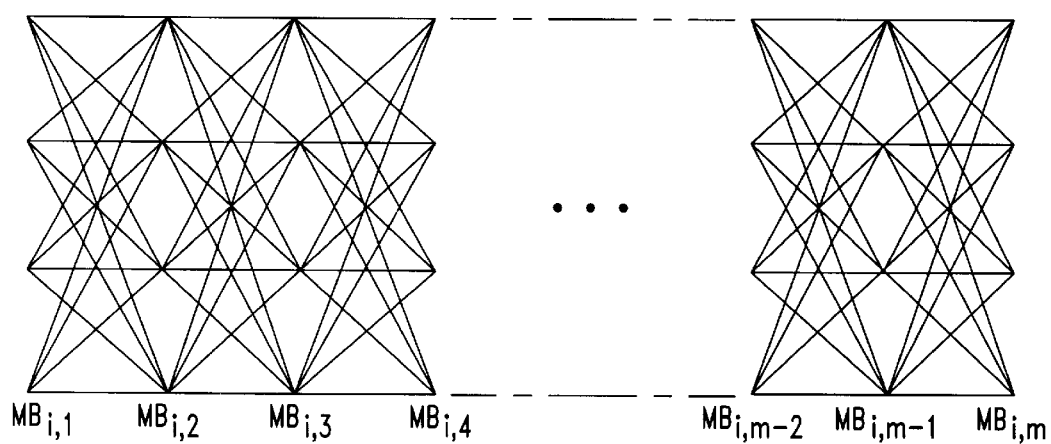
FIG. 2 shows a trellis search of coding modes for a slice in accordance with one aspect of embodiments of the present invention.

It is well known that a trellis search is very useful for solving this type of problem. However, to find an optimal set of coding modes using a frame-based trellis storage of all possible paths to the current macroblock would be required, thus necessitating excessive computation. This is because the rate and the distortion depend not only on the mode of the immediately preceding macroblock but also on those of the ensuing macroblock and the macroblocks in the previous slice, as shown in FIGS. 1A and 1B. (In FIGS. 1A and 1B a slice is illustratively a set of horizontally arrayed macroblocks.) To reduce the computational burden, we chose to ignore the dependency on the ensuing macroblock and we assume that the modes for the macroblocks in the previous slice are already determined. Then, the frame-based minimization problem can be converted to a slice-based one:

$$minimize_{(QP)} \sum_{i=1}^{n} \left[ minimize_{(M_i)} \sum_{j=1}^{m} J_{i,j}(QP, M_{i,j-1}, M_{i,j} | M_{i-1}) \right], \quad (3)$$

where $J_{i,j}(.)=D_{i,j}(.)+\lambda R_{i,j}(.)$ and $M_i$ is a set of coding modes for the macroblocks in the $i^{th}$ slice. In the trellis in FIG. 2, we store only four paths to the current macroblock and four accumulated costs corresponding to each path.

Then, the problems that remain are how to get the cost $J_{i,j}$ in Eq. (3) as well as QP and $\lambda$.

Normalized Rate-distortion Model

Rates and distortions for MCP and RC are required to calculate the cost $J_{i,j}$ in Eq. (3) for a given set of coding modes. While those quantities can easily be obtained for MCP, computing R and D for RC is very complex since it requires performing DCT, quantization of DCT coefficients and entropy-encoding of the quantization indexes. Therefore, we use our previous normalized rate-distortion model and associated coding techniques disclosed in the incorporated parent application of this continuation-in-part application to reduce computation for R and D for residual coding, RC, illustratively under the assumption that an 8×8 residual block can be characterized by mean (DC) and variance (V). In the following discussion we describe, by way of illustration, how to determine R and D when the block characteristics (energy values) are presented in terms of the variance, V. Those skilled in the art will appreciate that it is routine in light of the present disclosures to determine rates and distortions for MCP, and for RC when residual blocks are characterized by mean values, DC.

In practice, then, we illustratively calculate R and D for V based on look-up tables for the normalized rate-distortion curves, $\hat{D}$-$\hat{V}$ and $\hat{R}$-$\hat{V}$, as described in the incorporated parent application Ser. No. 09/178,088. These determinations are very efficient in terms of computational complexity and amount of required memory; all 62 R–V and D–V relations (two for each QP) are advantageously approximated from two curves obtained by normalizing V and D with $(2 QP)^2$. R–V and D–V curves for all QPs are obtained as follows:

R–V curve for QP from R–$\hat{V}$ model:
V→$\hat{V}$=V/(2.QP)$^2$→R,
D–V curve for QP from $\hat{D}$-$\hat{V}$ model:
V→$\hat{V}$=V/(2.QP)$^2$→$\hat{D}$→D=$\hat{D}$.(2. QP)$^2$.

This approach dramatically reduces the computation required for obtaining R and D for V. FIG. 3A and 3B, respectively, depict the $\hat{D}$-$\hat{V}$ and R–$\hat{V}$ models for interframe coding mode and intraframe coding mode, which are used in illustrative applications to H.263-compatible video codecs, where variance is used as the energy measure. In order to work with integer values of $\hat{S}$ and $\hat{D}$, we scaled $\hat{S}$ and $\hat{D}$ by a parameter k that can be chosen arbitrarily and does not affect the performance of the model. We conveniently set k to $2^{10}$ to reduce the computational burden for calculating R and D by adopting simple shift operations. Consequently, the $\hat{D}$-$\hat{S}$ and $\hat{R}$-$\hat{S}$ models in FIGS. 3A and 3B are for a linear quantizer with step size of $\sqrt{k}$.

Fast Search for QP and $\lambda$

We now describe a method for finding the pair (QP, $\lambda$) that provides nearly-optimal performance. While a full search scheme provides optimal performance, such a full search requires many iterations. Therefore, we developed a fast algorithm for finding a suboptimal solution, based on the frame-based R-QP function in Eq. (4), which is similar to one used in Ding, W. and B. Liu, "Rate control of MPEG video coding and recording by rate-quantization modeling," IEEE Trans. Circuits Syst. Video Technol., vol.6, no. 1, pp.12–20, February 1996, and the R–D function in Eq. (5).

$$R = a + \frac{b}{QP^c}, \quad (4)$$

$$R = \alpha + \frac{\beta}{D^\gamma}, \quad (5)$$

where c and $\gamma$ are set to 1.0 and 0.7, respectively, and a, b, $\alpha$, and $\beta$ are model parameters which are computed in the coding mode optimization process.

The fast search algorithm requires only 3 iterations and is described as follows:

Step 1: Calculate the target number of bits, $R_T$ for encoding the $n^{th}$ frame $X_{(n)}$, which is a function of the buffer fullness.

Step 2: Get a suboptimal QP with the following method:
(1) Set $\lambda=\lambda_{overall}$ and QP=QP$_0$=QP$_{(n-1)}$, where $\lambda_{overall}$ is the average of $\lambda$s over the previous 10 frames and QP$_{(n-1)}$ is QP for the previous frame.
(2) Perform coding mode optimization with (QP$_0$, $\lambda_{overall}$) and get the corresponding overall distortion $D_0$ and the required number of bits $R_0$.
(3) If $R_0<R_T$, set QP$_1$=QP$_0$-$\delta$, otherwise set QP$_1$=QP$_0$+$\delta$, where $\delta$ is a non-negative small integer. Then, get $D_1$ and $R_1$ with QP=QP$_1$.
(4) Model the R–QP curve by calculating a and b in Eq. (4) from (QP$_0$, $R_0$) and (QP$_1$, $R_1$).
(5) Using the model, calculate the suboptimal QP* corresponding to $R_T$.

Step 3: Model the R–D curve in Eq. (5) using ($D_2$, $R_2$) obtained with (QP*,$\lambda_{overall}$), then get a suboptimal $\lambda$*.

Step 4: Perform rate-distortion coding mode optimization with (QP*, $\lambda$*).

Illustrative Operating Results

An illustrative embodiment of the present inventive techniques are applied in typical operation to an H.263-compatible video coder which encodes video sequences at a target frame rate of 10 frames per second (fps) and for coding rates of 16 kbps, 24 kbps and 32 kbps. Algorithms provided in H.263 Software Version 3;0, University of British Columbia, Canada, May 1997, (referred to as TMN8_RC) are illustratively used for frame layer rate control and the calculation of the $R_T$. An illustrative buffer size was 1 frame, equivalent to 0.1 second. The QP for the first frame was set to 31 for all the three coding rates to minimize the delay by the first frame. To demonstrate performance of the present inventive techniques, we encoded four illustrative QCIF sequences (with frame size of 176×144): Mthr-dotr, Carphone, Foreman, and Miss America. Each sequence included 50 frames (at 10 fps).

Coding results on the sequences are given in Table 1(a), (b) and (c), which are for a coding rate of 16 kbps, 24 kbps and 32 kbps, respectively.

In Table 1 the following abbreviations are used:

TMN: Mode selection in TMN8 of H.263,
P-MS: Proposed coding mode selection;

$$\text{Skip Ratio} = \frac{\text{No. of skipped frames}}{\text{Total frames encoded}};$$

$$\text{PSNR} = 10\log_{10}\frac{255^2}{\text{MSE}}.$$

|  | Skip Ratio | | PSNR(Y) | (dB) |
|---|---|---|---|---|
| Sequence | TMN | P-MS | TMN | P-MS |
| (a) Coding rate = 16 kbps | | | | |
| Mthr-dotr | 0.08 | 0.06 | 30.9 | 31.5 |
| Carphone | 0.10 | 0.08 | 29.6 | 30.4 |
| Foreman | 0.22 | 0.18 | 27.4 | 28.3 |
| Miss America | 0.04 | 0.04 | 37.6 | 38.1 |
| (b) Coding rate = 24 kbps | | | | |
| Mthr-dotr | 0.04 | 0.04 | 32.3 | 32.7 |
| Carphone | 0.04 | 0.04 | 31.5 | 32.0 |
| Foreman | 0.06 | 0.04 | 28.8 | 29.4 |
| Miss America | 0.02 | 0.02 | 39.1 | 39.4 |
| (c) Coding rate = 32 kbps | | | | |
| Mthr-dotr | 0.02 | 0.02 | 33.3 | 33.5 |
| Carphone | 0.02 | 0.02 | 32.8 | 33.1 |
| Foreman | 0.02 | 0.02 | 30.9 | 31.3 |
| Miss America | 0.00 | 0.00 | 40.1 | 40.3 |

As can see from the tables for these examples, the coder with the present inventive coding mode selection method skips fewer frames than the coder with conventional mode selection. Thus, the present inventive techniques can estimate the number of bits more accurately. We also see that the present inventive techniques provide better PSNR performance by about 0.8 dB for the kbps example, 0.5 dB for the 24 kbps example, and 0.3 dB for the 32 kbps example. Thus, under the indicated conditions, the present coding mode optimization techniques provide greater improvement in rate control and in picture quality for a lower bitrate application. The PSNR performance with the present techniques is about 0.2 dB worse than that with the full search version, while providing a comparable rate control performance.

Systems employing the present inventive teachings will be realized in the form of general purpose computers programmed to perform the inventive methods and techniques described herein. In other applications the present teachings will find application in a range of special purpose coders, as well as transmission, storage and reproduction systems for video and multimedia information. In appropriate cases one or more semiconductor chip-based general purpose or special purpose processors will be employed with memory and other supporting capabilities to perform in accordance with the present teachings.

A new method for real time implementation of rate-distortion optimized coding mode selection has been disclosed that provides better rate control as well as better picture quality than conventional coding mode selection, especially when applied to very low bitrate video coding. The disclosed systems and methods provides performance comparable to the full search scheme, while requiring much lower computational complexity.

The disclosed methods and systems will find application in H.263-compatible video codecs and other MC-DCT-based video codecs of similar type, including the several MPEG-based algorithms. Likewise, embodiments of the present invention will be applied to rate optimized motion estimation as described, for example in Lee, S. J., K. H. Yang, and C. W. Lee, "A trellis searched rate-constrained motion estimator," *Proc. Int'l Workshop on HDTV*, Taipei, Taiwan, November 1995 and Chung, W. C., F. Kossentini and M. J. T. Smith, "An efficient motion estimation technique based on a rate-distortion criterion," *Proc. ICASSP*, 1996, pp. 1926–1929. Areas of application of the present inventive techniques, or systems and methods that will benefit from use of the present inventive teachings, include those described in Ding, W. and B. Liu, "Rate control of MPEG video coding and recording by rate-quantization modeling," *IEEE Trans. Circuits Syst. Video Technol.*, vol.6, no. 1, pp.12–20, February 1996. Aspects of the presently disclosed inventive subject matter are also described in Yang, K. H, and A. Jacquin, "Real Time Implementation of Rate-distortion Optimized Coding Mode Selection for H.263 Video Coders, *Proc. ICIP* 98, Chicago, October, 1998. The publications cited in this paragraph are hereby incorporated by reference in the present application, and should be considered to be set out in their entirety herein.

What is claimed is:

1. In a coder for coding frames of input video information, each frame comprising an ordered plurality, i=1, 2, ..., n, of slices, each slice comprising an ordered sequence j=1, 2, ..., m of macroblocks, each macroblock comprising a plurality of input signal values, the coder having a plurality of modes for coding macroblocks, a method for selecting a coding mode, $M_{i,j}$ for the jth macroblock in the ith slice, the method comprising determining values for a cost function, $J_{i,j}$, a quantizing parameter QP and a Langrangian multipliers $\lambda$, where $J_{i,j}(.)=D_{i,j}(.)+\lambda R_{i,j}(.)$, $D_{i,j}$ is the distortion for the jth macroblock in the with strip, and $R_{i,j}$ is the rate for coding the jth macroblock in the with strip, and determining a set of coding modes for each macroblock that satisfy $$minimize_{(QP)} \sum_{i=1}^{n} \left[ minimize_{(M_i)} \sum_{j=1}^{m} J_{i,j}(QP, M_{i,j-1}, M_{i,j} | M_{i-1}) \right].$$

2. The method of claim 1 wherein said rates and distortions are determined using a normalized rate-distortion model.

3. The method of claim 2 wherein said macroblocks are characterized by the variance of input values in respective macroblocks.

4. The method of claim 2 wherein said macroblocks are characterized by the mean of input values in respective macroblocks.

5. The method of claim 2 wherein said rates and distortions determined using said normalized rate-distortion model are obtained from values stored in a memory.

6. The method of claim 2 wherein said minimums are determined using a trellis search.

7. The method of claim 6 wherein said minimums for QP and $\lambda$ are determined by an exhaustive trellis search using values for said cost function determined using said normalized rate-distortion model.

8. The method of claim 6 wherein said minimums for QP and $\lambda$ are approximated using a suboptimal search method.

9. The method of claim 8 wherein said suboptimal search method comprises determining the relationships $$R = a + \frac{b}{QP^c},$$

and $$R = \alpha + \frac{\beta}{D^\gamma}.$$

where a, b, α, and β are model parameters which are computed in the coding mode optimization process.

10. The method of claim 9 wherein c and γ are set to 1.0 and 0.7, respectively.

11. The method of claim 1 where said minimums are achieved approximately, using a suboptimal method, the suboptimal method comprising A. determining the target number of bits, $R_T$ for encoding the $n^{th}$ frame $X_{(n)}$, which is a function of the buffer fullness.
  B. determining a suboptimal QP by performing the method comprising
    (i) setting $\lambda=\lambda_{overall}$ and and $QP=QP_0=QP_{(n-)}$, where $\lambda_{overall}$ is the average of λs over the previous 10 frames and $QP_{(n-)}$ is QP for the previous frame;
    (ii) performing coding mode optimization with ($QP_0$, $\lambda_{overall}$) to obtain the corresponding overall distortion $D_0$ and the required number of bits $R_0$;
    (iii) If $R_0 < R_T$, set $QP_1 = QP_0 - \delta$, otherwise set $QP_1 = QP_0 + \delta$, where δ is a non-negative small integer;
    (iv) determine $D_1$ and $R_1$ with $QP=QP_1$;
    (v) model the R–QP curve by calculating a and b in from ($QP_0$, $R_0$) and ($QP_1$, $R_1$);

$$R = a + \frac{b}{QP^c},$$

(vi) using said model, calculate the suboptimal QP* corresponding to $R_T$;
  C. model the R–D curve in
    using ($D_2$, $R_2$) obtained with (QP*,$\lambda_{overall}$) to obtain a suboptimal λ*;

$$R = \alpha + \frac{\beta}{D^\gamma},$$

D. performing rate-distortion coding mode optimization with (QP*, λ*).

12. The method of claim 11 wherein c and γ are 1.0 and 0.7, respectively.

13. In a coder for coding frames of input video information, each frame comprising an ordered plurality, i=1, 2, . . . , n, of slices, each slice comprising an ordered sequence j=1, 2, . . . , m of macroblocks, each macroblock comprising a plurality of input signal values, the coder having a plurality of modes for coding macroblocks, a system for selecting a coding mode, $M_{i,j}$ for the jth macroblock in the ith slice, the system comprising means for determining values for a cost function, $J_{i,j}$, a quantizing parameter QP and a Langrangian multiplierλ, where $J_{i,j}(.)=D_{i,j}(.)+\lambda R_{i,j}(.)$, $D_{i,j}$ is the distortion for the jth macroblock in the ith strip, and $R_{i,j}$ is the rate for coding the jth macroblock in the ith strip, and
  means for determining a set of coding modes for each macroblock that satisfy $$minimize_{(QP)} \sum_{i=1}^{n} \left[ minimize_{(M_i)} \sum_{j=1}^{m} J_{i,j}(QP, M_{i,j-1}, M_{i,j} \mid M_{i-1}) \right].$$

14. The system of claim 13 wherein said means for determining a set of coding modes comprises means for determining rates and distortions using a normalized rate-distortion model.

15. The system of claim 14 wherein said macroblocks are characterized by the variance of input values in respective macroblocks.

16. The system of claim 14 wherein said macroblocks are characterized by the mean of input values in respective macroblocks.

17. The system of claim 14 wherein said means for determining a set of coding modes comprises means for obtaining said rates and distortions from values stored in a memory.

18. The system of claim 14 wherein said means for determining a set of coding modes comprises means for performing a trellis search.

19. The system of claim 18 wherein said means for performing a trellis search comprises means for performing an exhaustive trellis search using values for said cost function determined using said normalized rate-distortion model.

20. The system of claim 18 wherein said means for performing a trellis search comprises means for determining minimum values for QP and λ approximately using a suboptimal search method.

21. The system of claim 20 wherein said means for determining minimum values for QP and λ approximately comprises means for determining the relationships $$R = a + \frac{b}{QP^c},$$

and $$R = \alpha + \frac{\beta}{D^\gamma}.$$

where a, b, α, and β are model parameters which are computed by said means for determining rates and distortions using a normalized rate-distortion model.

22. The system of claim 13 wherein c and γ are set to 1.0 and 0.7, respectively.

23. The system of claim 13 where said minimums are achieved approximately by a suboptimal search system, the suboptimal search system comprising A. means determining the target number of bits, $R_T$ for encoding the $n^{th}$ frame $X_{(n)}$, which is a function of the buffer fullness.
  B. means for determining a suboptimal QP by performing the method comprising
    (i) means for setting $\lambda=\lambda_{overall}$ and $QP=QP_0=QP_{(n-)}$, where $\lambda_{overall}$ is the average of λs over the previous 10 frames and $QP_{(n-)}$ is QP for the previous frame;
    (ii) means for performing coding mode optimization with ($QP_0$, $\lambda_{overall}$) to obtain the corresponding overall distortion $D_0$ and the required number of bits $R_0$;

(iii) means for setting $QP_1=QP_0-\delta$ if $R_0<R_T$, and otherwise setting $QP_1=QP_0+\delta$, where $\delta$ is a nonnegative small integer;
(iv) means for determing $D_1$ and $R_1$ with $QP=QP_1$;
(v) modeling the R–QP curve by calculating a and b in $$R = a + \frac{b}{QP^c},$$

from $(QP_0, R_0)$ and $(QP_1, R_1)$;
(vi) means for calculating the suboptimal QP* corresponding to $R_T$ using said model, C. means for modeling the R–D curve in $$R = \alpha + \frac{\beta}{D^\gamma},$$

using $(D_2, R_2)$ obtained with $(QP^*, \lambda_{overall})$, to obtain a suboptimal $\lambda^*$;
D. means for performing rate-distortion coding mode optimization with $(QP^*, \lambda^*)$.

24. The system of claim 23 wherein c and $\gamma$ are 1.0 and 0.7, respectively.

* * * * *